(12) United States Patent
Beland

(10) Patent No.: US 6,738,275 B1
(45) Date of Patent: May 18, 2004

(54) HIGH-VOLTAGE X-RAY GENERATOR

(75) Inventor: Robert Beland, St. Marthe sur le Lac (CA)

(73) Assignee: Electromed Internationale Ltee., Saint-Eustache (CA)

( * ) Notice: Subject to any disclaimer, the term of this patent is extended or adjusted under 35 U.S.C. 154(b) by 0 days.

(21) Appl. No.: 09/711,789

(22) Filed: Nov. 13, 2000

Related U.S. Application Data
(60) Provisional application No. 60/164,541, filed on Nov. 10, 1999.

(51) Int. Cl.[7] .................................................. H02M 7/00
(52) U.S. Cl. ....................................... 363/71; 363/21.02
(58) Field of Search ............................. 363/65, 66, 67, 363/69, 70, 71, 21.02, 21.03

(56) References Cited

U.S. PATENT DOCUMENTS

| | | | | |
|---|---|---|---|---|
| 3,708,739 A | * | 1/1973 | Kohler et al. ............... | 363/71 X |
| 4,797,801 A | | 1/1989 | Furuhashi et al. ............ | 363/43 |
| 4,802,079 A | * | 1/1989 | Mizoguchi .................... | 363/71 |
| 4,967,333 A | | 10/1990 | Callier et al. ................ | 363/17 |
| 5,023,769 A | | 6/1991 | Beland ......................... | 363/86 |
| 5,056,125 A | | 10/1991 | Beland ......................... | 378/101 |
| 5,241,260 A | | 8/1993 | Beland ......................... | 323/270 |
| 5,388,139 A | | 2/1995 | Beland ......................... | 378/112 |
| 5,391,977 A | | 2/1995 | Beland ......................... | 323/268 |
| 5,495,165 A | | 2/1996 | Beland ......................... | 323/270 |
| 5,559,686 A | | 9/1996 | Patel et al. ................... | 363/43 |
| 5,661,774 A | | 8/1997 | Gordon et al. ............... | 378/101 |
| 5,814,938 A | | 9/1998 | Beland et al. ................ | 315/3 |
| 5,966,425 A | | 10/1999 | Beland ......................... | 378/108 |
| 6,111,732 A | | 8/2000 | Beland ......................... | 361/42 |
| 6,118,227 A | | 9/2000 | Beland ......................... | 315/276 |
| 6,144,170 A | | 11/2000 | Beland et al. ................ | 315/276 |
| 6,424,098 B1 | | 7/2002 | Beland et al. ................ | 315/224 |

OTHER PUBLICATIONS

Patent Abstracts of Japan vol. 008, No. 239 (E–276), Nov. 2, 1984 & JP 59 117470 A (Toshiba Corp.), Jul. 6, 1984.
Patent Abstracts of Japan vol. 1998, No. 06, Apr. 30, 1998 & JP 10 052039 A (Meidensha Corp.), Feb. 20, 1998.
European Search Report issued in European Patent Application No. EP00310011 on Apr. 3, 2001.

* cited by examiner

Primary Examiner—Jessica Han
(74) Attorney, Agent, or Firm—Ivan David Zitkovsky

(57) ABSTRACT

A power supply for a device which has a load, comprising a first resonant generator and a second resonant generator, coupled in parallel, each generator having a phase output. The power supply further comprises a control circuit coupled to the first and second generators controlling the first and second phase outputs, wherein the first phase output and the second phase output are summed to provide a variable power supply to the load.

40 Claims, 14 Drawing Sheets

HIGH-VOLTAGE X-RAY GENERATOR

RELATED APPLICATIONS

This application claims priority under 35 U.S.C. §119 and the Paris Convention to the U.S. Provisional Patent Application Serial No. 60/164,541 filed Nov. 10, 1999, the disclosure of which is incorporated herein by reference in its entirety.

BACKGROUND OF THE INVENTION

The present invention relates to an apparatus for powering X-ray tubes, and more particularly, to using a stack of medium-voltage high-frequency inverters.

SUMMARY OF THE INVENTION

Typical X-ray generators are devices that supply regulated, high-voltage, DC power to X-ray producing vacuum tubes, as well as power to the tube filament. The high-voltage is applied between the anode and the cathode of the tube. In a conventional X-ray tube, X-rays are produced be generating electrons by thermionic emission from a tungsten filament (cathode). The electrons are then accelerated to an anode (which may be rotated for wear-averaging purposes) to generate the X-rays. The X-ray emissions are controlled by the applied voltage or potential between the anode and the cathode, as well as by the anode current. X-ray energy is controlled by the applied voltage, typically between 40 kV and 150 kV for medical applications, but sometimes as low as 20 kV as in mammography.

X-ray intensity is determined by anode current, which is controlled by varying filament power. Varying filament power changes the filament temperature, thus varying the electron emission of the cathode. Most electrons emitted by the cathode reach the anode and constitute anode current. Filament power ranges from a few tens to a few hundred watts. Typically anode currents range from as low as 500 microamperes, as in lower power continuous fluoroscopy, to as high as 1 ampere, as in conventional radiography or during cine-radiography runs and computed-tomography (CT) scans.

The high-voltage is either applied continuously, though at low power levels, or as medium to high power pulses or pulse trains. In continuous mode, typical power levels are on the order of 1 kilowatt (100 kV×1 ma); in pulsed mode, instantaneous power levels are on the order of 150 kW (150 kV×1A). X-ray generators used in medial applications have power ratings in the 10 to 100 kilowatt range.

X-ray generators pypically employ one of two fundamental methods to produce the required high-voltage, DC power. In one method, line frequency generators use a step-up transformer to raise the AC line voltage to the desired level, and then rectify and filter the high AC voltage to obtain DC voltage. Due to the low line frequency and high power levels involved, and due to the high amount of insulation required, the transformer and filter capacitors are very bulky and very expensive. The use of dielectric insulated oil is mandatory to achieve the level of insulation required and to assist in dissipating the heat lost in the transformer windings and other components. The insulating transformer oil creates a large space requirement, creates very heavy equipment, and requires seals which often allow the transformer oil to leak and create an environment hazard as well as degrade the line frequency generator. The second method of X-ray generator involves a high-frequency generator using a high-frequency inverter typically made up of a high-frequency oscillator, a high-frequency high-voltage transformer, a high-frequency high-voltage rectifier, and a high-frequency high-voltage filter to obtain the high DC voltage required. The inverter is powered directly from a low voltage DC source such as a battery bank or from the rectified and filtered AC line. Although many inverter topologies exist, high frequency generators typically use a resonant-inverter topology. In this configuration, the high frequency oscillator drives the primary winding of the transformer through a damped resonant circuit. This resonant circuit is generally composed of an inductor, a capacitor, and an equivalent resistance due to the external load connected to the secondary winding of the transformer, and reflected to the primary. The resonant circuit can be configured with the inductor, capacitor, and resistor in parallel or series. Power transferred to the load, thus voltage across the load, can be varied by changing the oscillator frequency. Power is maximum when the circuit is at resonance, that is, when the inductive reactance is exactly cancelled by the capacitive reactance of the circuit. Power drops when the oscillator frequency is either lower or higher than resonant frequency. High-frequency generators are much smaller and lighter than comparable line frequency generators, due to the reduced size of the transformers, capacitors, and inductors; however, typical high-frequency generators still require use of dielectric insulating oil to insulate and dissipate heat in the transformer windings and other components.

All X-ray generators use a high voltage divider to measure accurately the high-voltage outputs. The high voltage divider is made up of a string of equal value multimegaohm resistors, the top of which is connected to the high voltage output, the bottom of it going to a voltage sampling resistor, that in turn is connected to the high voltage return which is grounded. Typical divider ratio is 1V: 10 kV and divider current is on the order of 1 milliampere (ma). High voltage dividers have to be frequency-compensated by connecting a small capacitor in parallel with each resistor, such as to maintain divider accuracy and pulse shape integrity when the high voltage is pulsed. Capacitor values must be many times larger than the stray capacitances that exist between the divider sections and the surroundings. High voltage capacitors are costly and large, so a typical capacitor-compensated high voltage divider is a bulky and expensive device.

Instead of using compensating capacitors, high voltage dividers can also be guarded by enclosing each resistor in a cylindrical shield section that is maintained at about the same potential as the enclosed resistor, as disclosed in U.S. Pat. Nos. 5,023,769 and 5,391,977. This potential is obtained through a second resistor string that is not used for measurement. This ensures that essentially no current flows through the inevitable stray capacitances since there is very little potential difference between any resistor of the precision divider and its own guard section.

The high voltage output of the X-ray generator is connected to the X-ray tube anode and cathode by means of a pair of high voltage coaxial cables. Cable lengths range from a few feet to about 50 feet. The inner conductor carries the high tension and is thoroughly insulated from the outer coaxial conductor, which is solidly grounded for safety purposes. Because of their coaxial construction, high voltage cables behave as transmission lines; characteristic impedance is normally 50 ohms and capacitance is on the order of 50 picofarads per foot. Tube arcing between anode and cathode, or between either tube electrode and ground, is a rather frequent occurrence. It is equivalent to a momentary short circuit across the tube end of the high voltage cable. Since the high voltage cable acts as a transmission line, the short circuit typically reflects back all of the energy received from the line. The reflected energy adds to the incoming energy and provokes a very large voltage spike at the generator end of the line. The sum of the high voltage output from the generator and the spike will oscillate between twice the normal high voltage output and some negative value, inverting in fact the polarity of the output, until all of the reflected energy has been damped. Due to the large spike, output components of an unprotected X-ray generator will catastrophically and irreversibly fail when the X-ray tube arcs. Nevertheless, many cost-conscience X-ray high-frequency generators are not protected against tube arcing. Tube arc protection is typically implemented with a specially designed lossy inductor, where the inductance of the device slows the rise time of the fault current, and the resistance of the device damps the reflected energy, as disclosed in U.S. Pat. Nos. 5,241,260 and 5,495,165. Slowing the rise time of the fault current allows time for other protective devices, such as fuses and shutdown circuitry, to take over and limit the value of the fault current to tolerable levels. The damping resistance avoids resonance between the high voltage cable and the large filter capacitors of the generator output. The arc protection inductor is large and expensive since it must be carefully designed to withstand the very strong electromagnetic forces and high voltages that develop across it during the onset of the fault.

Precise control of the voltage and phase of the power supply to an X-ray tube is important to ensure proper imaging for diagnostic purposes and to avoid unnecessary exposure of the patient to X-ray radiation which does not produce a useable image. For example, during a conventional radiographic gastrointestinal analysis, the patient ingests a radioopaque liquid containing barium. When the patient ingests the liquid, the doctor turns on the X-ray generating tube at a low level and positions the patient between the X-ray tube and a fluoroscopic screen. The doctor analyses the patient's gastrointestinal track while the barium flows through it. When the doctor sees a part of the procedure he/she wants to record, she typically replaces the fluoroscopic screen with a photographic plate and increases the X-ray to a level intense enough to expose the plate.

Typical high voltage generators are available for up to 100 kilowatts for medical applications, because of component limitations, rapidly rising costs of components, and because electromagnetic interference emissions become increasingly more expensive to contain. However, many medical procedures require more power and cannot use existing high-frequency generators. Furthermore, load currents below 10 milliamperes are also hard to achieve for high voltage generators. This value is too high for low-power, continuous fluoroscopy which typically runs at 0.5 to 2.0 milliamperes. This minimum current constraint is mostly dictated by the stability criteria of the voltage control loop which requires some amount of damping in the output circuit. In the specific case of the variable frequency resonant inverter, the frequency range required to control output power over such a large range also limits the practical span of power output available from the generator. Furthermore, while power efficiency for high-frequency, high voltage generators at full output can reach 85%, that is, 15% of the input power is lost as heat, efficiency is generally very poor at low power levels such as used in fluoroscopy. Indeed, power losses in high frequency generators are mostly due to switching losses of the active inverted devices. In particular, in the variable frequency, resonant inverter typology, reactive power remains high in the resonant circuit even when the real power delivered to the load is small and, therefore, switch losses remain consequently high.

In the pulsed fluoroscopy operating mode, the X-ray generator output is repetitively switched on and off, typically in synchronism with an X-ray detecting device such as a video camera coupled to a fluoroscopic imaging intensifier. This mode is widely used since it reduces the X-ray dose by turning on the X-ray source only when the detecting device is ready to acquire a new image, and turning it off while the detecting device is busy processing the acquired image. In pulsed fluoroscopy mode, typical pulse repetition rates range from 10 to 90 pulses per second and typical pulse widths from 1 to 10 milliseconds. A 100 microsecond rise time represents 10% of the pulse width of a 1 millisecond pulse. Repetitively pulsing an X-ray generator output on and off means that the output of a generator goes from zero to approximately 100 kV and back to zero, for each pulse. The X-ray tube current will also be pulsed-shaped, its peak value being determined by the generator output voltage and by the tube filament temperature set by filament current. Typical peak currents range from 5 ma to 50 ma.

As mentioned above, the high voltage output of the X-ray generator is connected to the X-ray tube by means of a pair of high voltage coaxial cables that have a capacitance on the order of 50 picofarads per foot and links ranging from 3 to 50 feet. Thus, the total capacitance of these cables must be charged to the full output voltage, and discharged back to zero, for every pulse of the generator output. The charge current must be supplied by the generator and its intensity determines the rate of rise of the voltage by the well-known formula $i = C \, dv/dt$ and consequently the rise time. In this same manner, the discharge current must flow through a cable discharge circuit that shunts the cable capacitance and is triggered every time discharging is required. The intensity of this discharge current then determines the fall time of the pulse. For example, a 20 foot cable will have a capacitance of around 1,000 picofarads and the charge, or discharge, current will need to be 1,000 milliamps to raise, or drop, the voltage by 100 kV in 100 microseconds.

Pulsed fluoroscopy presents a special challenge to the designers of control loops for all types of X-ray generators in the sense that instantaneous voltage, current, and power vary very widely and very rapidly during each of the repetitive pulses. In the high frequency generator that uses the resonant inverter topology, where output power is solely controlled by varying the oscillator frequency, this is nearly impossible to do neatly without a further discharge module with high voltage and low voltage portions in a circuit to limit the "tail" in the output waveform and increase image quality by discharging any capacitive voltage remaining on the cable connected the same, as disclosed in U.S. Pat. No. 5,056,125.

In one illustrative embodiment, a power supply for a device which has a load is disclosed. A first resonant generator and a second resonant generator are connected in parallel and each have a phase output. A control circuit is coupled to the first and second generators and controls the first and second phase outputs. The first and second phase outputs are summed to provide a variable power supply to the load.

In another illustrative embodiment, a method controls first and second generators connected in parallel. The generators each have a phase output. The method includes the steps of setting a first phase to the output of the first generator and setting a second phase to the output of the second generator.

The method further includes the step of selectively shifting at least one phase output of the generators to achieve a predetermined magnitude of a voltage in a predetermined time.

In still another embodiment, an apparatus for supplying operating power to an X-ray generating source is disclosed. A frequency oscillator mechanism generates an oscillator frequency. A plurality of magnetically coupled inverter modules are coupled to a plurality of resonant circuits. The resonant circuits include an inductor mechanism, a voltage limiting mechanism, and a resistor mechanism. The apparatus also includes an X-ray generating source.

In yet another illustrative embodiment, an apparatus for supplying operating power to a load device is disclosed. A frequency oscillator mechanism generates an oscillator frequency. A plurality of magnetically coupled inverter modules receive the oscillator frequency and are coupled to a plurality of resonant circuits. The resonant circuits include an inductor mechanism, a voltage limiting mechanism, and a resistor mechanism. The plurality of inverter modules are each coupled to at least one transformer device having a primary winding and a secondary winding. The apparatus also includes at least one DC voltage rectifier mechanism and a load sharing mechanism which substantially equalizes the power load on each inverter module.

In another illustrative embodiment, an apparatus for supplying operating power to a load device is disclosed. A frequency oscillator mechanism generates an oscillator frequency. A plurality of magnetically coupled inverter modules receive the oscillator frequency and are coupled to a plurality of resonant circuits. The resonant circuits include an inductor mechanism, a voltage limiting mechanism, and a resistor mechanism. The plurality of inverter modules are each coupled to at least one transformer device having a primary winding and a secondary winding. The apparatus also includes at least one DC voltage rectifier mechanism and a means for sharing the load of the load device substantially equally between the plurality of resonant inverter modules.

In still another embodiment of a system for generating X-ray beams utilizing a plurality of inverter modules, a method for controlling power is disclosed. The method includes the steps of arranging the plurality of inverter modules interconnected by at least one magnetic coupling and selectively disconnecting at least one module from the magnetic coupling.

In another embodiment of a system for generating X-ray beams utilizing a plurality of inverter modules, a method for dissipating is disclosed. The method includes the steps of arranging the plurality of inverter modules interconnected by at least one magnetic coupling and selectively disconnecting at least one module from the magnetic coupling.

In yet another embodiment, an apparatus supplying operating power to an X-ray generating source is disclosed. A transistor switching circuit includes a slew rate detecting circuit, a variable delay circuit, and a feed back loop coupling the slew rate detecting circuit to the variable delay circuit.

In a further embodiment, a method for switching in a system for generating X-ray beams is disclosed. The method includes the steps of sensing a slew rate and generating a delay time for switching transistors based on the slew rate. The transistors invert a current. The method also includes the step of switching the transistors.

In another embodiment, a shielded resistor divider circuit is disclosed. A resistor mechanism has opposing end terminals and a shield limits electrical noise and stray capacitance from interfering with the operation of the resistor mechanism. The shield includes a plurality of paired conductive members disposed along the length of the resistor mechanism and has opposing end terminals. The pairs of conductive members separate the resistor mechanism into separate portions by providing alternating first and second pairs of conductive members along the length of the resistor mechanism. The shield also comprises a capacitor series comprising a plurality of serially connected capacitor mechanisms disposed a predetermined distance from the resistor mechanism and having opposing end terminals. Each capacitor mechanism is connected between adjacent first and second pairs of conductive members which are connected to the end terminals of the capacitor series. The dynamic impedance of the capacitor series is less than the dynamic impedance of the resistor mechanism. The shield also includes a diode bridge series which has a plurality of connected diode bridges coupled to the capacitor series. The end terminals of the resistor mechanism are connected between a higher-voltage potential and a lower voltage potential. The end terminals of the capacitor series are connected between the higher voltage potential and ground. Electrical noise and stray capacitance is coupled to the capacitor series and does not interfere with the resistor mechanism.

In still another embodiment, a shielded resistor circuit is disclosed. A first insulating sheet and a second insulating sheet each have an opposing inner and outer face. The sheets are disposed in parallel with their inner faces adjacent one another. A resistor mechanism is disposed between the inner faces. A first series of paired conductive members are disposed adjacent the resistor mechanism. Each pair of the first series of conductive members include a first member disposed on one of the inner faces, a second member disposed on the outer face opposing the other inner face, and means for connecting the first and second members. A second series of paired conductive members are disposed adjacent the resistor mechanism. Each pair of the second series of conductive members include a third member disposed on the outer face opposing the one inner face, a fourth member disposed on the other inner face, and means for connecting the third and fourth members. Each pair of the second series are disposed between two pairs of the first series. The combined first and second series have opposing end terminals. A capacitor series, including a plurality of serially connected capacitor mechanisms, is disposed between the inner faces a predetermined distance from the resistor mechanism and has opposing end terminals. Each capacitor mechanism is connected to an adjacent pair of the first series and a pair of the second series. The end terminals of the conductive members are connected to the end terminals of the capacitor series. The dynamic impedance of the capacitor series is less than the dynamic impedance of the resistor mechanism. The shielded circuit also comprises a diode bridge series comprising a plurality of connected diode bridges coupled to the capacitor series. The end terminals of the resistor mechanism are connected between a higher-voltage potential and a lower-voltage potential. The end terminals of the capacitor series are connected between the higher-voltage potential and ground. Electrical noise is coupled to the capacitor series and does not interfere with the resistor mechanism.

In yet another embodiment, an X-ray generating source and regulated power supply is disclosed including an X-ray generating source and a regulator circuit. The regulator circuit receives an input signal and regulates at least one of a duration and an amplitude of the input signal to produce a high-voltage output signal for operating the X-ray generating source. A protection circuit is disposed between the regulator circuit and the X-ray generating source for limiting a rate of change of a transient voltage spike produced at the source to a predetermined value and protecting the regulator circuit. A plurality of series connected resistor mechanisms are coupled to the source of the transient high-voltage spike. The resistor mechanism has a stray inductance.

In a further embodiment, a transformer device is disclosed. A single core includes a substantially rectangular-shaped ferrite core having four sides. Each side is a section of the rectangular-shaped magnet. Two primary windings are mounted on the core. Each primary winding is on an opposing side of the rectangular ferrite core. Two secondary windings are mounted on the core. Each secondary winding is on one of the same opposing sides of the rectangular-shaped ferrite core.

In another embodiment, a transformer device for an X-ray generating device is disclosed. A single core includes a substantially rectangular-shaped magnet having four sides. Each side is a section of the rectangular-shaped ferrite core. Two primary windings are mounted on the core. Each primary winding is on an opposing side of the rectangular magnet. Two secondary windings are mounted on the core. Each secondary winding is on one of the same opposing sides of the rectangular-shaped ferrite core.

Various embodiments of the present invention provide certain advantages and overcome certain drawbacks of prior devices, systems, and methods. Embodiments of the invention may not share the same advantages and those that do may not share them under all circumstances. This being said, the present invention provides numerous advantages including the advantages of achieving high voltage output in an X-ray generator; use of inexpensive and common parts to decrease the costs of maintenance and manufacture; smaller, lighter, and environmentally reliable generators; generating infinite run time in X-ray generators without over-heating; decrease need for environmental cooling fans; limiting high thermal and electrostatic stress concentrations in a power generator; limiting losses at less than full power in a power generator; increasing the duty factor of a high voltage generator; permitting low current operations including low-power continuous fluoroscopy with a high voltage generator; limiting effects of single-shot and recurrent tube arcing; permitting continuous operation with defective inverter modules; permitting single phase and three-phase AC supply or direct supply from a DC source for a high voltage generator; and generating shorter rise time pulses required by high performance pulsed fluoroscopy.

Further features and advantages of the present invention as well as the structure and method of various embodiments of the present invention are described herein in detail below with reference to the accompanying drawings.

BRIEF DESCRIPTION OF THE DRAWINGS

Various embodiments of the invention will now be described, by way of example, with reference to the accompanying drawings, in which.

DETAILED DESCRIPTION OF THE PREFERRED EMBODIMENT

Figure 1:
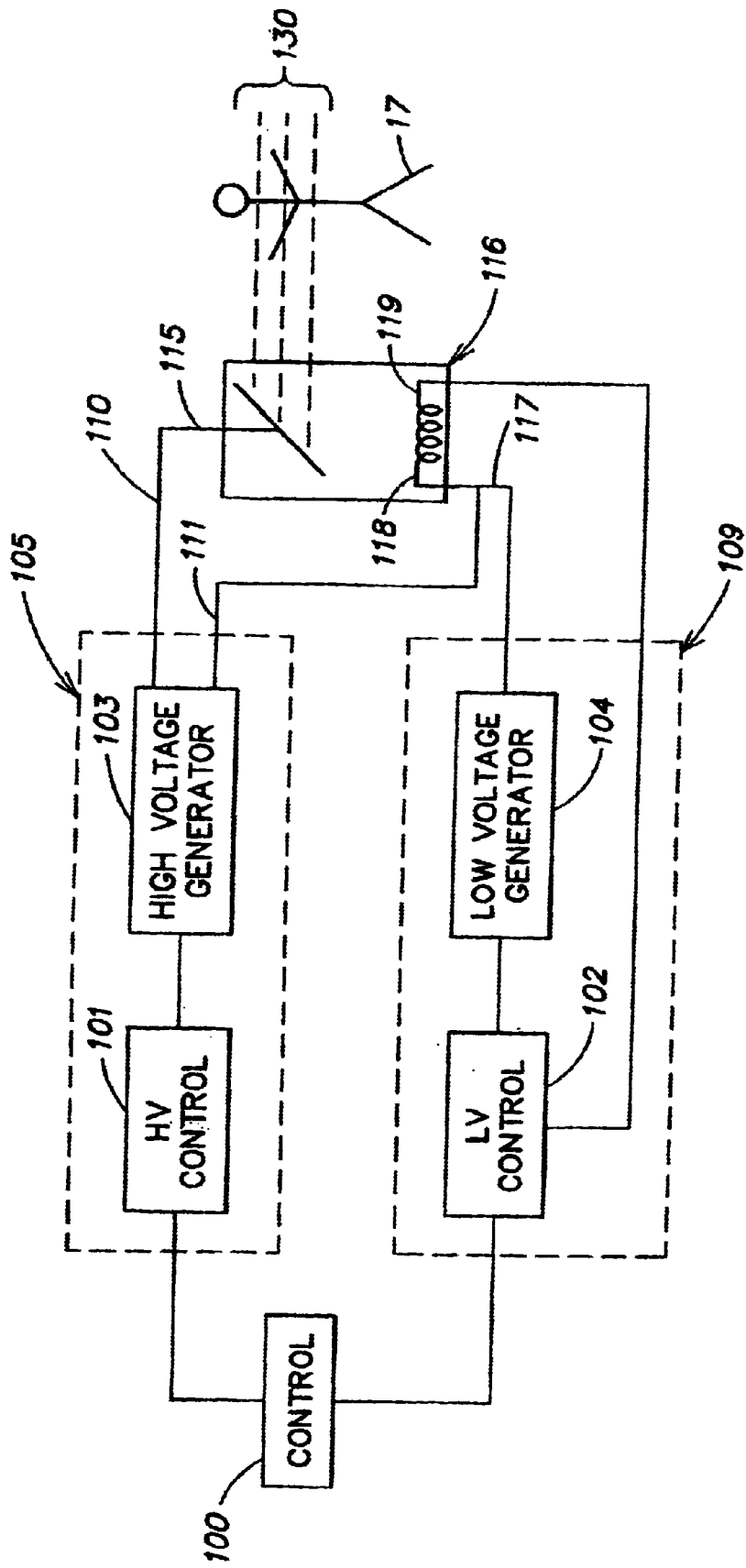
FIG. 1 is a block diagram of a high-voltage power supply constructed in accordance with the present invention.

In an embodiment of the present invention, as shown in FIG. 1, a high-voltage high-frequency X-ray generator comprises a control circuit 100, which couples to a high voltage section 105 comprising a high-voltage control circuit 101 coupled to a high-voltage generator 103; further couples to a low-voltage section 109 comprising a low-voltage control circuit 102 coupled to a low-voltage generator 104. Two outputs 110,111 of the high voltage section 105 are coupled to an anode 115 and a cathode 118, respectively, of an X-ray tube 116. An output of the low-voltage generator 104 couples to a first terminal 117 of a filament of the X-ray tube. According to an aspect of the invention, when the high-voltage section 105 supplies a voltage across the X-ray tube and the low-voltage section 109 supplies a current through the X-ray filament. The X-ray tube generates an X-ray beam 130 that irradiates a subject 17.

Figure 2:
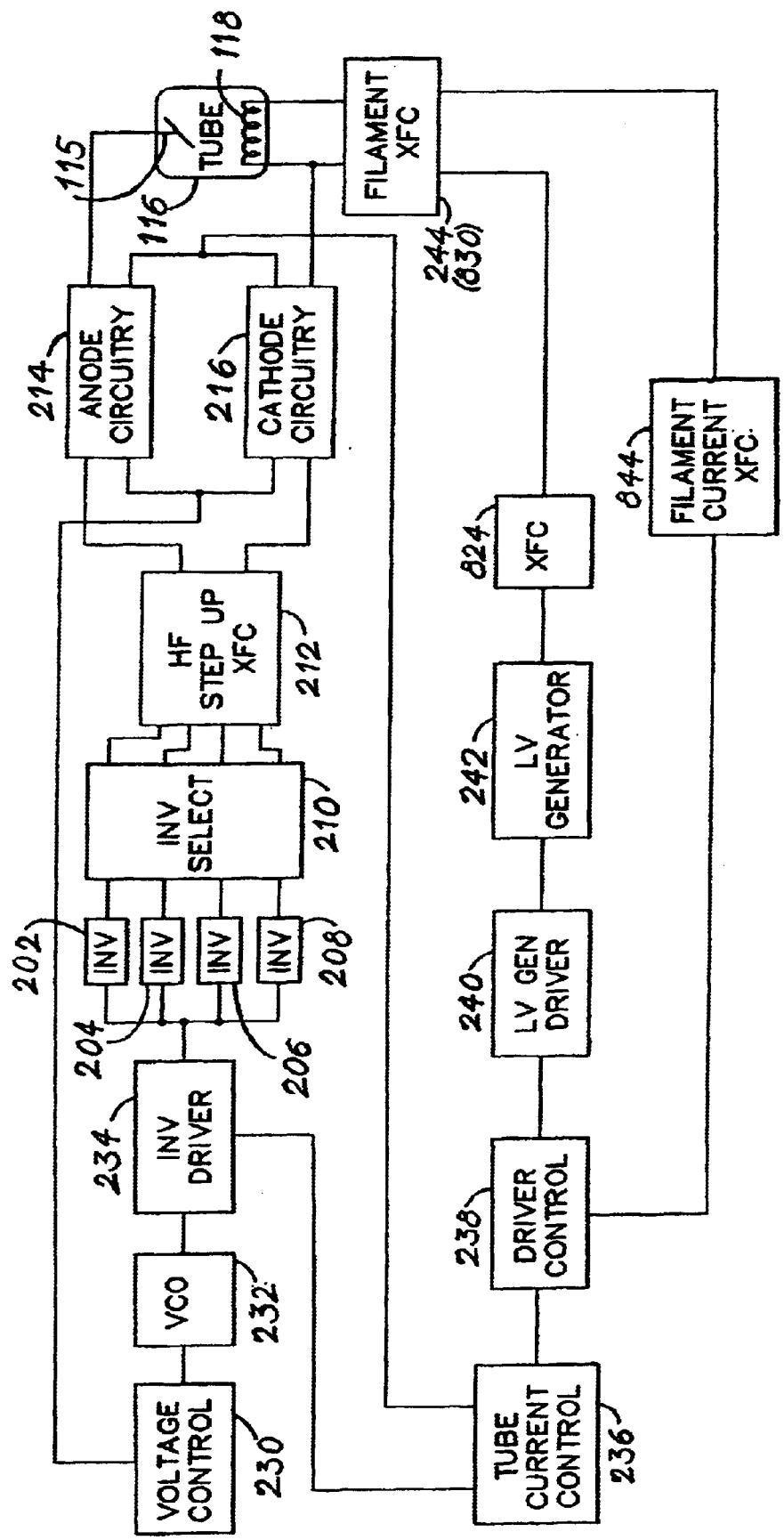
FIG. 2 is a more detailed diagram for the high-voltage power supply of this invention.

In an embodiment of the present invention, a High Voltage High Frequency X-ray Generator can be assembled by coupling four medium voltage high frequency inverter modules 202, 204, 206 and 208 in series, as shown in FIG. 2. In FIG. 2, two of the four medium voltage high frequency inverter modules provide a current to a primary winding of a high frequency step up transformer 212. The high frequency step up transformer 212 subsequently couples to an anode high voltage module 214, which provides operating power to anode of 115 X-ray tube 116. A second pair of the four medium voltage high frequency modules couples to a high frequency step up transformer 21, which subsequently couples to a cathode high voltage module 216. The cathode high voltage module supplies operating power to a cathode 118 of the X-ray tube.

In an embodiment of the present invention, a generator voltage control mechanism is implemented using a voltage control feedback loop comprising a voltage control circuit 230 coupled to a voltage controlled oscillator circuit 232; further coupled to an inverter module driver circuit 234; further coupled to a stack of a the plurality of inverter modules 202, 204, 206 and 208; further coupled to an inverter module selection circuit 210; further coupled to a high frequency step-up transformer 212; further coupled to a high voltage anode module 214 and a high voltage cathode module 216; each high voltage module further coupled to an anode and a cathode of a X-ray tube; and the output of the high voltage modules are coupled back to the voltage control circuit 230.

In an embodiment of the present invention, a generator current control mechanism is implemented using a tube-current control feedback loop comprising a current control circuit 236 coupled to an inverter driver control circuit 234, inverter driver for a plurality of medium voltage high frequency inverter modules 202, 204, 206 and 208, and an output of the high voltage modules 214 and 216. The current control circuit 235 is further coupled to a low voltage inverter driver 240; further coupled to a low voltage inverter module 242; further coupled to a filament transformer 244 (transformer 830 shown in FIG. 8); further coupled to the cathode of an X-ray tube 116; further coupled to a filament current measurement circuit 246 (including a current transformer 844 shown in FIG. 8); coupled backed to the inverter driver control circuit 238.

High-voltage Section
Medium-Voltage High-Frequency Inverter Modules

In an embodiment of the present invention, four medium-voltage high-frequency ("MVHF") inverter modules are used to supply high-voltage high-frequency power. According to one aspect of the invention, a MVHF inverter module comprises four insulated-gate-bipolar-transistors (IGBTs) Q1–4 coupled in a bridge configuration, shown in FIG. 7. The four IGBTs further couple four diodes D1–4 (diode 624 in FIG. 6) and four snubber capacitors SC1–4 across source-drain terminals of each IGBT. Each IGBT is coupled to a gate driver (inverter driver 234 schematically shown in FIG. 2 and shown in detail in FIG. 6). It should be appreciated that the number of MVHF inverter modules correspond to a voltage requirement of an output of the high-voltage generator and therefore the scope of the invention should not be limited to four inverter modules. The number of inverter modules determine both the output voltage and power. That is, 8 modules instead of four could supply twice the power at the same voltage. According to an aspect of the present invention, the inverter modules use space as insulator and fill with thermosetting compound which gives a smaller device with easier mintenance and more environmentally safe because we do not use dielectric oil the thermosetting compound may be dopes to dissipate heat with a thermally conductive filler material including, but not limited to aluminum oxide.

Figure 7:
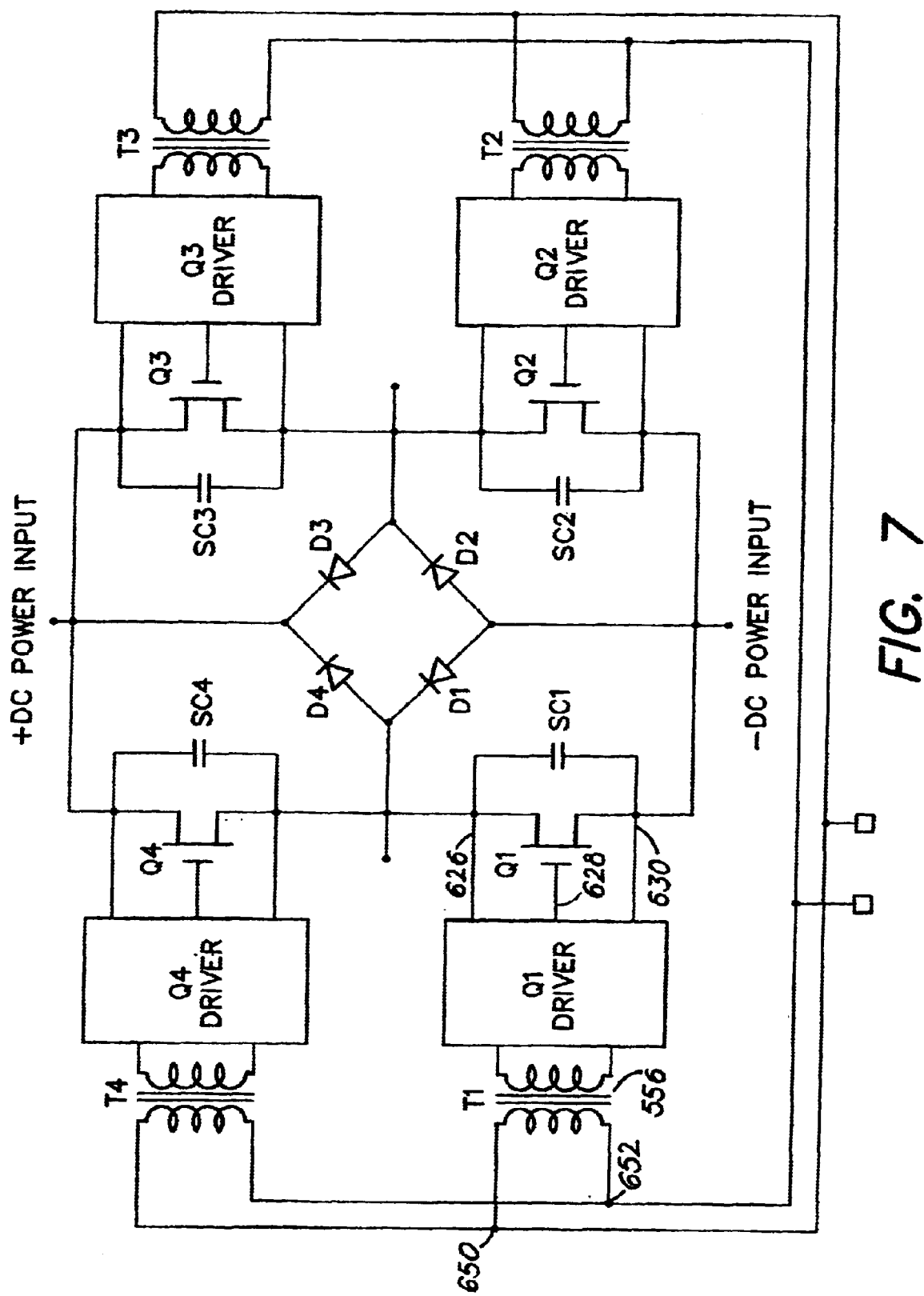
FIG. 7 is a schematic of a high voltage inverter module in accordance with one embodiment of the invention.

As shown in FIG. 7, IGBT top left and IGBT bottom right are driven by a common gate drive signal through drive transformers T1 and T4. Similarly IGBT bottom left and IGBT top right are driven by a second common gate drive signal through an isolating drive transformer T3 and T2.

Figure 6A:
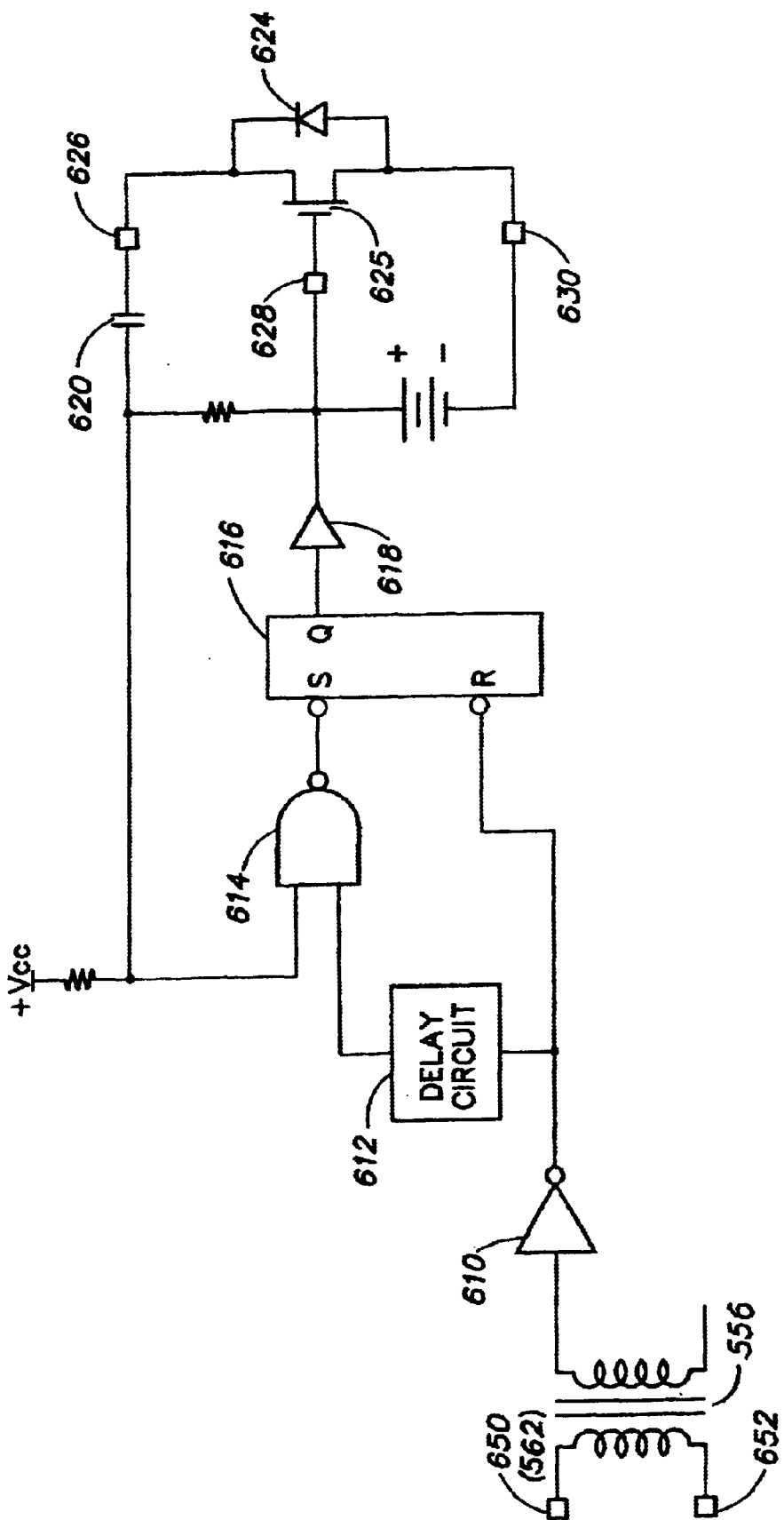
FIG. 6A is a schematic of an inverter driver in accordance with one embodiment of the invention.
Figure 6B:
FIGS. 6B and 6C are wave forms associated with switching employed in one embodiment of the invention.
Figure 6C:

As shown in FIG. 6, the output signal of each drive transformer is shaped by a driver circuit before being applied to the corresponding IGBT gate.

Although the inverter output is a substantially square wave, the resonant circuit connected in series with the transformer primary acts like a narrow band path filter that attenuates all harmonics of the square wave, leaving only a fundamental frequency. Hence, the drive to the transformer is essentially sinusoidal.

Figure 13:
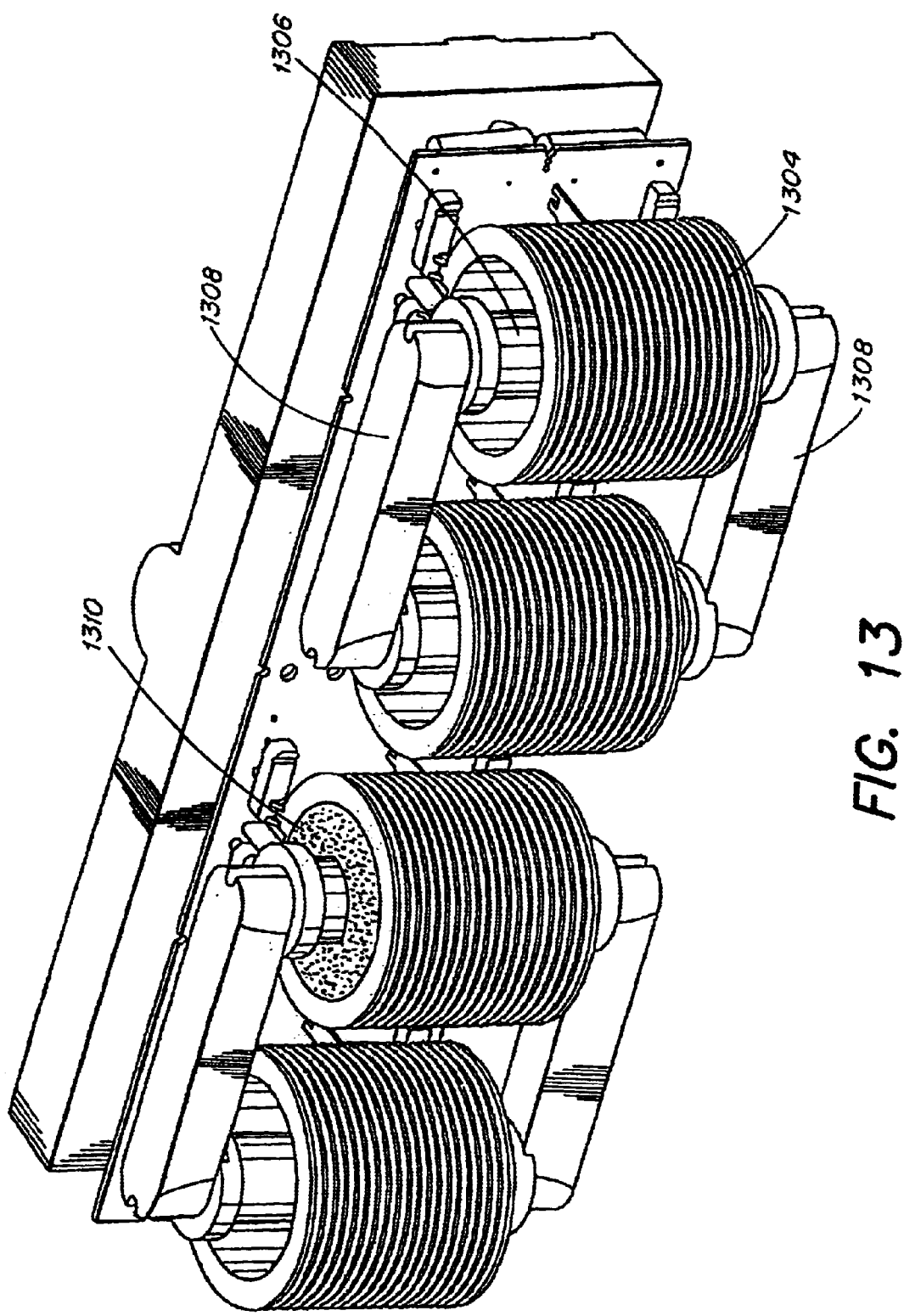
FIG. 13 is a perspective view of an anode high-voltage section in accordance with one embodiment of the invention.

As shown in FIG. 13, The step up transformer construction is symmetrical, with coils located on the opposite legs of a UU-type round section ferrite core 1308. At the core, each coil may be comprised of: (1) a cylindrical plastic bobbin slipped over the core; (2) a primary and a tertiary winding, with an equal number of turns, and wound together as bifilar windings on the top of the bobbin 1306. As shown in FIG. 13, the primary windings are installed concentric and equally spaced from the secondary bobbin 1304. The inner space 1310 between primary and secondary windings as the complete high-voltage section is embedded in silicone rubber for insulation purposes.

All windings are wound with insulated Litz wire. Typically, Litz wire is used to reduce skin effects which are important at the 100–300 kilohertz frequencies involved. Since the voltage across each section of the secondary is only about 780 volts, there is no need for paper insulation between the layers of the secondary. The ribs that separate the secondary core trenches increase high voltage surface tracking distance. The high voltage barrier is molded and made from Polyphenylene Oxide PPO. The trench form isolation is rated at 80 kilovolts minimum.

The two primary windings are connected in parallel and are connected to the output of the resonant inverter. The two tertiary windings are connected in parallel with all of the tertiary windings of all generator modules. Each secondary winding is parallel connected through coupling capacitors 2a, 3 stage rectifier stack in the high voltage section.

The balance winding connecting all the high-voltage transformers together equalizes the DC output voltage of each section. Without this connection the tolerance of the tuned circuit components (LC) would give different output voltages in each section. Therefore the current flowing through the balance winding is to compensate automatically for this imbalance.

Figure 11:
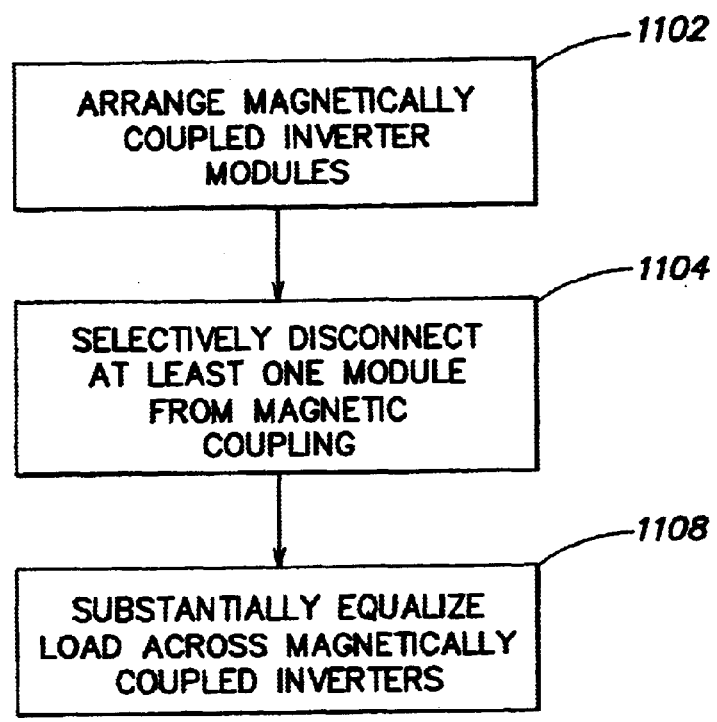
FIG. 11 is a flow chart of an embodiment of the invention.

Also a metal section X-ray tube has 20% more cathode current than anode current. This 20% must not cause an output power imbalance under this condition, the current flows through the balance winding in order to supply the cathode transformer with 20% more current. This makes it possible to obtain the same anode and cathode voltage even with this imbalance. Now referring to FIG. 11, a flow chart for an embodiment directed to a method for controlling power and/or heat dissipation in a system for generating X-ray beams utilizing a plurality of inverter modules is shown. At step 1102, the magnetically coupled inverter modules are arranged. At step 1104, at least one inverter module is selectively disconnected from the magnetic coupling. At step 1108, the load across the remaining magnetically coupled inverters is substantially equalized.

High Voltage Control Circuit

In an embodiment of the present invention, the High Voltage Generator supplies operating power to an X-ray tube operating in a Continuous Fluoroscopy mode.

In another embodiment of the present invention, the High Voltage High Frequency Generator supplies operating power to an X-ray tube operating in a Pulsed Fluoroscopy mode. Accordingly, the high voltage control circuit 11, shown in FIG. 1, in the high voltage section 15 of the high voltage generator comprises a Voltage Controlled Oscillator circuit and Phase-Shifter circuit. It should be appreciated that this embodiment of the invention can also operate in a continuous fluoroscopy mode, therefore the scope of the invention should not be limited to a single-mode embodiment of either continuous fluoroscopy or pulsed fluoroscopy or a combination of both.

Figure 5:
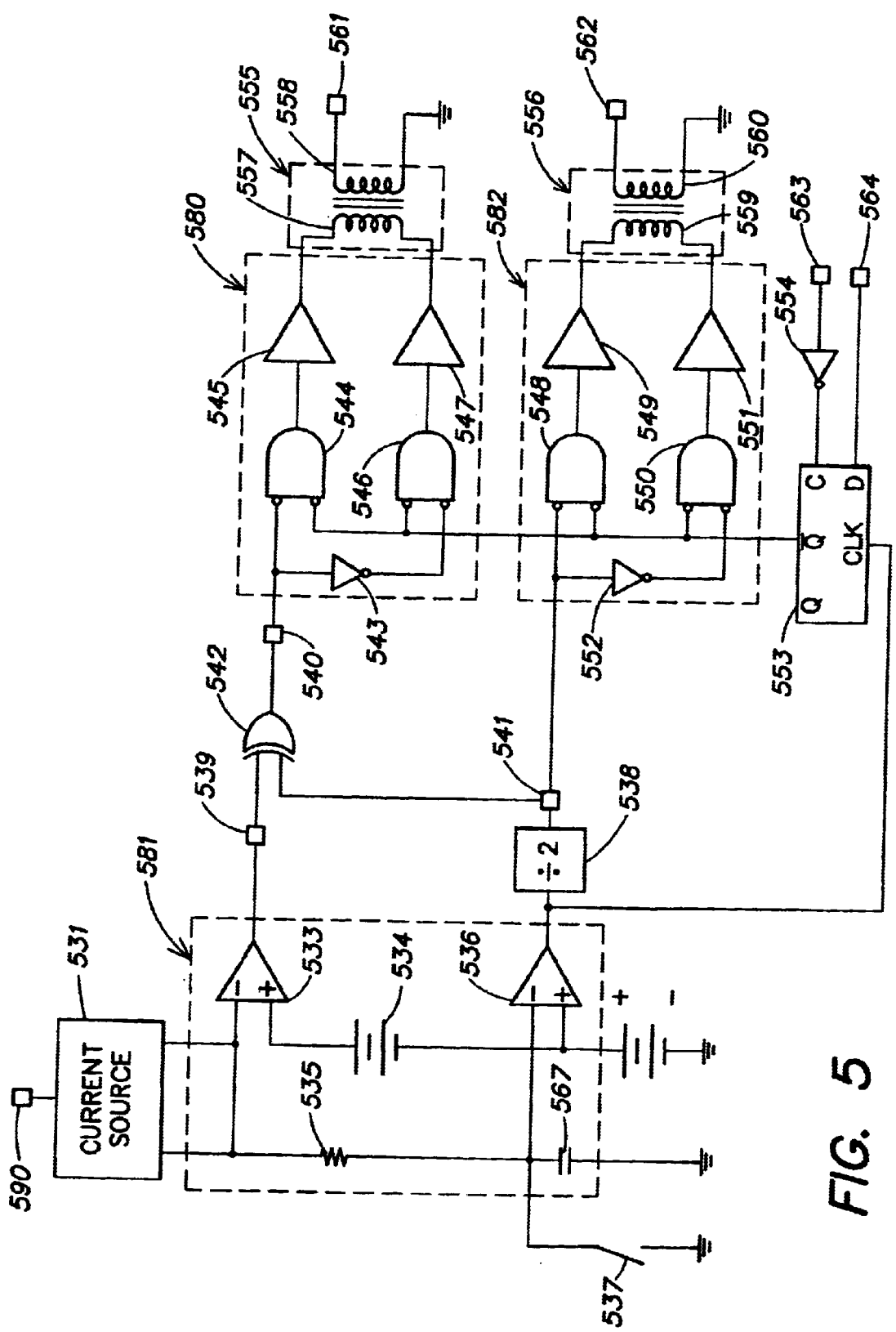
FIG. 5 is a schematic of a voltage controlled oscillator with phase shift in accordance with one embodiment of the invention.

According to an aspect of the present invention, shown in FIG. 5, the high voltage control circuit comprises a voltage-controlled oscillator ("VCO") circuit that drives a phase-shifter circuit 542, and two transformers 555 and 556. The two transformers 555 and 556 isolates amplifiers 580 and 581 from the high-voltage control circuit outputs 561 and 562 respectively. The first amplifier 581 couples to a VCO output thought node 541 and drives transformer 556, while the second amplifier 580 couples to the phase-shifter circuit 542 through node 540 and drives transformer 555.

A first output of transformer 556 drives one half of the inverter modules, while a second output of transformer 555 drives another half of the inverter modules. In both halves of inverter modules, all four gates of the Insulated-Gate-Bipolar-Transistors ("IGBTs") of each inverter are excited in parallel through the drive transformers T1 to T4, shown in FIG. 7. As shown in FIG. 5, the VCO controls all of the anode medium voltage high frequency modules and all of the cathode medium voltage high frequency modules.

The VCO (Voltage-Controlled Oscillator) circuit comprises a ramp generator 581, and there is a phase shift circuit for creating a variable delay signal. The ramp generator 581 comprises a timing capacitor 567 and level comparators 533 and 536. The timing capacitor 567 is linearly charged between two fixed voltage levels by a variable current source 531 that depends on a control signal coupled to node 590. The charging current from the current source determines duration of the upward ramp. The timing capacitor 567 is rapidly discharged back to a law voltage level when its voltage reaches a high voltage level. The oscillator frequency increases with a control voltage, from a predetermined minimum frequency at zero volt to a predetermined maximum frequency at a maximum control voltage. However, the output frequency is halved by a flip-flop 538 that is incorporated into the circuit to obtain a symmetrical output wave form.

According to an aspect of the present invention, a voltage control feedback loop drives the VCO. The voltage control feedback loop is an operational amplifier circuit. The operational amplifier circuit comprises a proportional integral derivative (PID) high voltage control loop. The integral and the derivative perimeters are set by a resistor-capacitor resonant ("RC") circuit, associated with the operational amplifier circuit. The controller compares a predetermined value to an actual value of the high voltage and outputs a control voltage to the VCO that is proportional to the difference between the two voltages, as well as to a derivative and an integral term. There is a single predetermined value of the high voltage for the total anode to cathode voltage. The actual value of the high voltage is obtained by summing a measurement of the cathode and anode voltages that is obtained from sampling resisters connected between the bottom of the high voltage dividers and the ground. The summing is performed by operational amplifiers.

In FIG. 6.1, a drive signal from the VCO is shown as a square wave form. A delay in the switching of IGBT 625 is produced by a timer 612, shown in FIG. 6.0. Timer 612 is coupled to the square wave drive signal. A first rising edge of the square wave drive signal initiates the delay, as the square wave drive signal is coupled through the drive transformer. The delay ends as soon as the drain voltage of the IGBT 625 becomes slightly negative, and the latch 616 to turn on only when their drain to source voltage is about zero. Hence, a switching of the IGBT 625 at near zero crossing is achieved.

A second wave form in FIG. 6.2, labeled "DELAYED SWITCHING" shows a wave form of IGBT 625 switching with a dead time compensation.

Dead Time Control Mechanism (VCO and Phase Shift)

According to an aspect of the present invention, the VCO circuit in the high voltage control circuit couples to a phase-shifter circuit. An output of the VCO circuit drives two of the inverter modules in the high voltage section and an output of the phase-shifter circuit, a phase-shifted derivative of the VCO circuit output, drives another two of the inverter modules in the high voltage section.

The phase shift can be set to 0 in one instance. By controlling a frequency f of the oscillator circuit with respect to a natural resonant frequency f0 of the Inductor-capacitor resonant ("LC") circuits of the inverter modules, operating power supplied to the load can be controlled. As the frequency of the oscillator diverges from the resonant frequency f0, the inductive reactance of the high voltage section become mismatched with the capacitive reactance of the high voltage section, thus the operating power supplied to the load is decreased. In another instance, by making the ratio of f/f0 very large or very small, the power of the load can be made, theoretically, very small. However, the inventor has discovered that the practical operational range limits the ratio of f/f0 to 1:3 or 3:1. The available power range is therefore limited to approximately 1:20.

In another instance, for a fixed oscillator circuit frequency f, the phase shift angle N of a phase-shifting circuit is linearly varied from 0 to 180. Since the current supplied to the common load is the vector sum of the currents supplied by each of the N inverters, this means that at 0 phase shift, the current coming out of the second group of N/2 inverters will directly add to the currents coming out of the first group and the power delivered to the load will be at a maximum. But this also mean that at 180 phase shift, the currents coming out of the second group of inverter modules will exactly cancel the currents coming out of the first group and the power delivered to the load will be substantially zero. Intermediate phase shift angles will result in intermediate values of the power delivered to the load.

Figure 10:
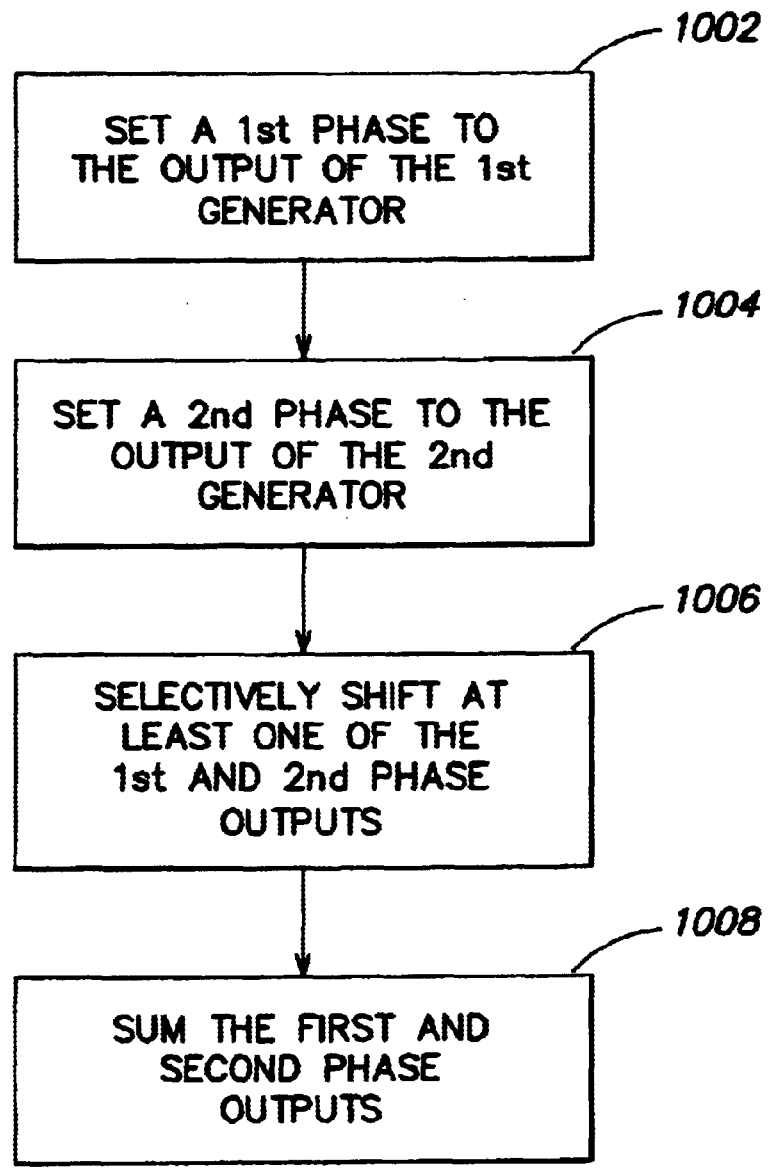
FIG. 10 is a flow chart of an embodiment of the invention.

Now referring to FIG. 10, a flow chart of an embodiment directed to a method for controlling at least two voltage generators connected in parallel is shown. At step 1002, the phase of the first generator output is set and at step 1004, the phase of the second generator output is set. At step 1006, any combination of the generator output may be phase shifted to achieve a predetermined magnitude of a voltage in a predetermined time. In one embodiment, at step 1008, the phase outputs of the at least two generators may be summed.

Inverter Driver and Automatic Dead Time Adjustment

The inverter driver circuit is coupled to each of the high-voltage transistors in the MVHF inverter module to provide a control mechanism for the switching of the IGBT high-voltage transistor 625. As shown in FIG. 6, transformer 556 magnetically couples a clock signal from the VCO, nodes 650 and 652, to the gate driver for each of the IGBT high-voltage transistors. The transformer 556 isolates the clock signal from the DC input supply. The secondary winding of the transformer is coupled to an inverter 610. The clock signal is a substantially square waveform. The inverter 610 inverts the clock input and provides the inverted clock to a delay circuit 612. The delay of about 400 nS allows the other IGBT high-voltage transistor on the same side of the bridge to turn off before the slew rate a NAND Gate 614 is enabled. When the other IGBT high-voltage transistor on the same side of the bridge turns off, the voltage at node 626 starts falling. This falling voltage, coupled through capacitor 620, holds the output of NAND gate 614 high. The voltage at node 626 is clamped to a value no lower than the voltage at node 630 by diode 624. When the voltage at node 626 reaches the value at node 630, Capacitor 620 no longer holds the output of NAND gate 614 high and a flip flop 616 is set and thus the IGBT high-voltage transistor 625 is turned on. This technique insures that high-voltage transistor 625 always turns on with zero volts across it and thus eliminates switching losses. The time required for the voltage at node 626 to reach the value at node 630 varies with both the DC input supply and the load current, yet high-voltage transistor 625 is always turned on as soon as this condition is met, thus increasing the inverter efficiency.

Figure 12:
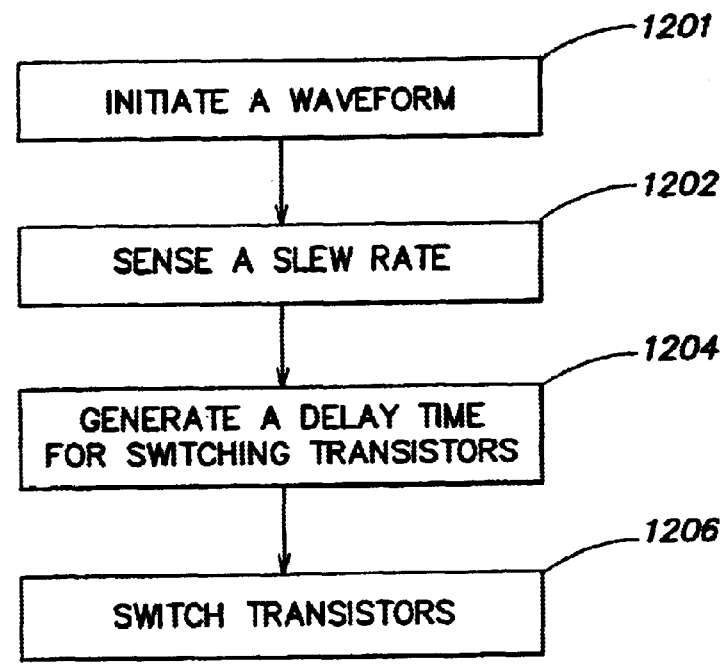
FIG. 12 is a flow chart of an embodiment of the invention.

Now referring to FIG. 12, a flow chart of an embodiment of the invention directed to a method of switching in a system for generating X-ray beams is shown. According to an aspect of the invention a waveform maybe initiated at step 1201. At step 1202, a slew rate is sensed. At step 1204, a delay time for switching is generated based on the sensed slew rate. At step 1206, the transistors are switched, wherein the transistors invert a current. The delay time may be variable and/or adaptable. This delay time may limit switching losses. The delay time may vary with respect to many factors including, but not limited to an input supply and load current. According to an aspect of the invention, the delay time is varied corresponding to the waveform initiated at step 1201 and sensed at step 1202.

High Voltage Module

Figure 3A:
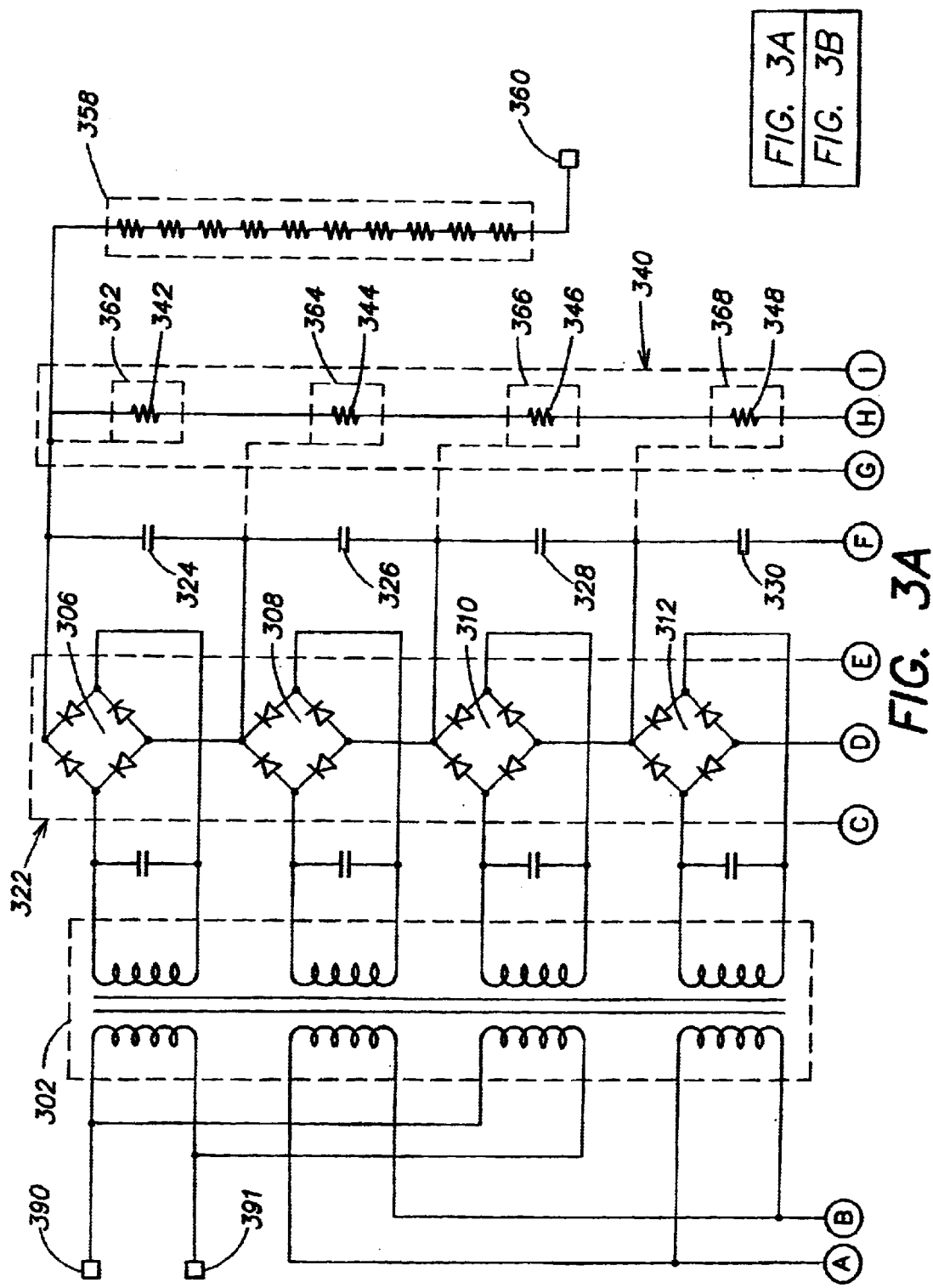
FIGS. 3A and 3B show a schematic diagram of the cathode/anode high voltage section in accordance with one embodiment of the invention.
Figure 3B:
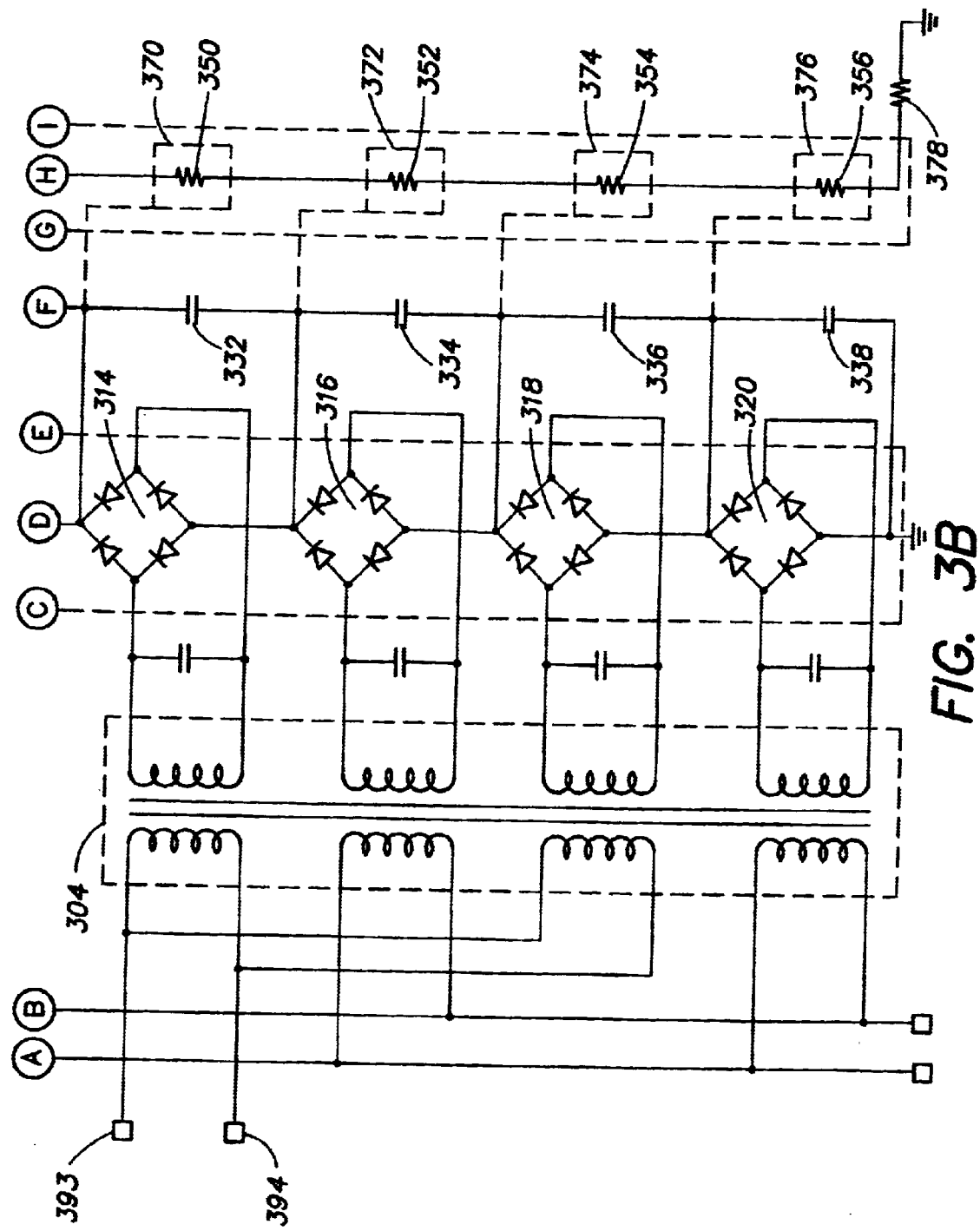

FIG. 3 shows an embodiment of high voltage module of the present invention. The high voltage module is coupled to two MVHF inverter modules and supplies a positive DC operating current to the anode 115 of X-ray tube 116 (shown in FIG. 2). As shown in FIG. 3, nodes 390 and 391 are coupled to a first MVHF inverter module and nodes 393 and 394 are coupled to a second MVHF inverter module. The high voltage module comprises two high-frequency transformers 302 and 304. The first high-frequency transformer coupled to four high-voltage rectifier bridges (306–12) and a the second high-frequency transformer coupled to another four high voltage rectifier bridges (314–320). It should be understood that the scope of the invention should not be limited to four inverter modules. The eight high voltage rectifier bridges are coupled in series to create a high voltage rectifier stack 322, wherein each high voltage rectifier bridge is further coupled to a filter capacitor (324–338). The high-voltage rectifier stack is further coupled, in series, to a high-voltage divider 340 comprising eight resistors 342–356. It should be appreciated that the number of resistor corresponds to the number of high-voltage rectifiers, therefore the scope of the invention should not be limited to eight high-voltage rectifiers or eight resistors in the high-voltage divider. The high-voltage divider 340 is further coupled to an arc-protection circuit 358.

A first alternating current ("AC") current from a first MVHF inverter module flows through a first primary winding and a second primary winding of the high-frequency transformer 302. The magnetic coupling between a first primary winding of high-frequency transformer 302 and a first secondary winding and a second primary winding and a second secondary winding of the high-frequency transformer 302 provides a second AC current corresponding to the first AC current in each of the two secondary windings. The second AC currents in each of the two secondary windings are coupled through coupling capacitors, which are coupled in parallel with the two secondary windings, to two high-voltage rectifier bridges each coupled to one of the two secondary windings. The AC currents are converted to DC currents by the high-voltage rectifier bridges 306–320 and the DC currents are filtered by the filter capacitors 324–338. As the DC currents flow through the high-voltage divider 340, a voltage is generated across each of the resistors 342–356 of the high-voltage divider. This DC voltage is coupled through an arc-protection circuit 358 and is coupled through node 360 to the anode 115 of the X-ray tube 116.

The anode and cathode high voltage sections arc identical, except that the anode high voltage section provides a positive high voltage to the X-ray tube anode, while the cathode high voltage section provides a negative high voltage to the X-ray tube cathode, and includes a filament drive transformer 244 (shown in FIG. 2).

The rectifier stack is comprised of four identical fill wave rectifiers. Each tripler rectifier is composed of three full wave, four diode bridges with an output filter capacitor across DC output of each bridge. The DC outputs of all 16 total, 8 anode, 8 cathode, bridges are coupled in parallel. The AC input of the four transformers are all are coupled in parallel. A capacitor (resonant capacitance C) is connected across each transformer secondary windings (16 in total).

The bridges are assembled from 68 high voltage rectifier diodes with ratings of 400 milliampere average forward current and eight kilovolts reverse blocking voltage. The 16 resonant capacitors are 15 picofarad, 10 kilovolts, film capacitors. The 16 output filter capacitors are 10 nanofarad, 10 kilovolts, film capacitors.

This arrangement provides up to 75 kilovolts positive to the anode of the X-ray tube, and 75 kilovolts negative to the cathode with reversed diode pluralities.

High-Voltage Divider

The high-voltage divider 340 is comprised of 8, 20 megaohm resistors coupled in series for both the anode and cathode modules. The DC current coupled through the high-voltage divider is then about 0.3 milliamperes at 75 kilovolts. The 16 resistors are assembled along side the 16 stage high voltage rectifier stack and close to the 16 filter capacitors. The whole rectifier filter divider assembly is sandwiched between two circuit boards where large traces are connected to potential taps between each multiplier stage. This topology guards each resistor of the precision divider at the proper potential without requiring any other component, and thus, ensuring fast pulse response.

The resistor series of the high-voltage divider 340 corresponds to the high-voltage rectifier stack, that is, the ratio of the number of resistors in the high-voltage divider to the number of the high-voltage rectifiers is one to one.

According to an aspect of the present invention, a spatial arrangement on two circuit boards, the high-voltage rectifier stack, the high-voltage divider and the filter capacitors, provides voltage compensation for each resistor of the high-voltage divider by forming a substantially complete Faraday Cage about each resistor of the high-voltage divider.

Figure 9:
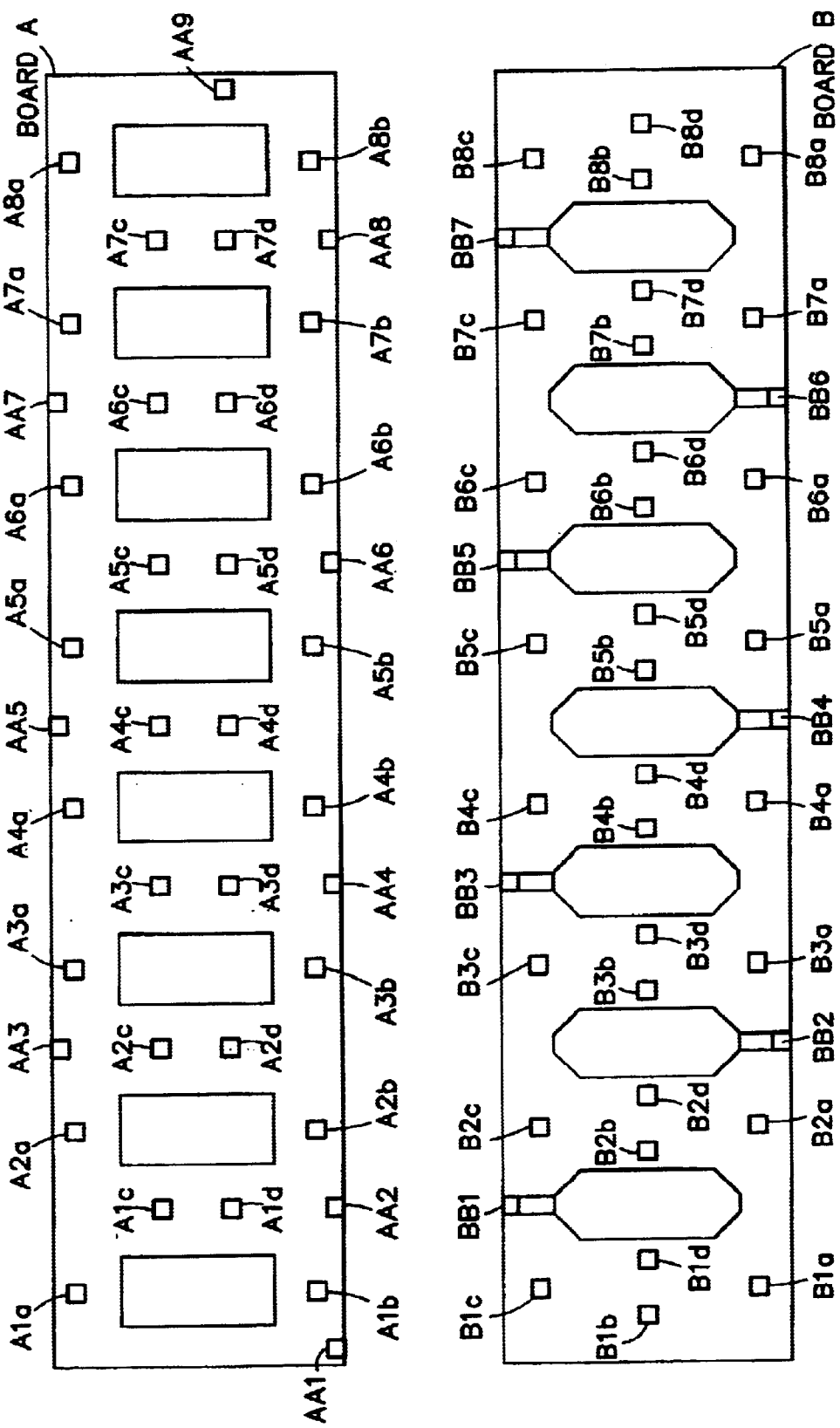
FIG. 9 is a schematic diagram of the shielded resistor divider in accordance with one embodiment of the invention, showing top plan views of the first and second boards.

According to an aspect of the present invention shown in FIG. 9, the spatial arrangement of the high-voltage rectifier stack, the filter capacitors, and the high-voltage divider comprises a first capacitor of the filter capacitors coupled across mount holes A1*a* and A1*b* on Board A; a second capacitor coupled across mount holes A2*a* and A2*b*; a third capacitor coupled across mount holes A3*a* and A3*b*; a fourth capacitor coupled across mount holes A4*a* and A4*b*; a fifth capacitor coupled across mount holes A5*a* and A5*b*; a sixth capacitor coupled across mount holes A6*a* and A6*b*; a seventh capacitor coupled across mount holes A7*a* and A7*b*; an eighth capacitor coupled across mount holes A8*a* and A8b; a first diode bridge of the high-voltage rectifier stack coupled across mount holes B1a, B1b, B1c, and B1d; a second diode bridge coupled across mount holes B2a, B2b, B2c, and B2d; a third diode bridge coupled across mount holes B3a, B3b, B3c, and B3d; a fourth diode bridge coupled across mount holes B4a, B4b, B4c, and B4d; a fifth diode bridge coupled across mount holes B5a, B5b, B5c, and B5d; a sixth diode bridge coupled across mount holes B6a, B6b, B6c, and B6d; a seventh diode bridge coupled across mount holes B7a, B7b, B7c, and B7d; an eighth diode bridge coupled across mount holes B8a, B8b, B8c, and B8d; a first resistor of the high-voltage divider coupled across mount holes A1c and A1d; a second resistor coupled across mount holes A1c and A2d; a third resistor coupled across mount holes A3c and A3d; a fourth resistor coupled across mount holes A4c and A4d; a fifth resistor coupled across mount holes A5c and A5d; a sixth resistor coupled across mount holes A6cand A6d; a seventh resistor coupled across mount holes A7c and A7d; an eighth resistor coupled across mount holes A8c and A8d; the eight resistors coupled in series by electrically coupling mount holes AA1 to A1c, A1d to A2c, A2d to A3c, A3d to A4c, A4d to A5c, A5d to A6c, A6d to A7c, A7d to A8c, and A8d to AA9; forming the substantially complete Faraday Cage by electrically coupling mount holes A1b to B1c; A2b to B2c; A3b to B3c; A4b to B4c; A5b to B5c; A6b to B6c; A7b to B7c; A8bto B8c; and by electrically coupling potential tap at BB1 to AA2; potential tap at BB2 to AA3; potential tap at BB3 to AA4; potential tap at BB4 to A5; potential tap at BB5 to AA6; potential tap at B136 to AA7.

Are Protection Circuit

As shown in FIG. 3, arc protection circuit 358 is coupled between the high voltage divider 34 and a load coupling at node 360. The inventor discovered that a classical arc protection mechanism using a lossy inductor can be replaced by a plurality of resistive elements coupled in series. In an embodiment of the present invention, ten 50-ohm, 10 Watt resistors are coupled in series, each resistor having five microhenries of stray inductance. This resistor series functions as an equivalent inductor with an inductance of 50 micro henries, and a series resistance of 500 ohms. It should be appreciated that the number of resistors used in the art protection circuit 358 correspond to a predetermined resonant property of the arc protection circuit, therefore the scope of the invention should not be limited to 10 resistors.

The equivalent inductance of the arc protection circuit 358 prolongs the rise time of a fault current, and the equivalent resistance damps a reflected energy from a load. By prolonging the rise time of a fault current, fuses and a shutdown circuitry are given time to limit the fault current to a tolerable level. The equivalent resistance also prevents a ringing, or a resonance between the high-voltage cable and the equivalent capacitance of the high-voltage generator output.

While eliminating the need for a costly and bulky inductor, the Arc Protection Circuit described above has been demonstrated to provide fill protection against one-shot and recurring tube arcs, which are independent from the transmission line effects of the high voltage coaxial cables.

Low-Voltage Section
Low Voltage DC Supply

Figure 4:
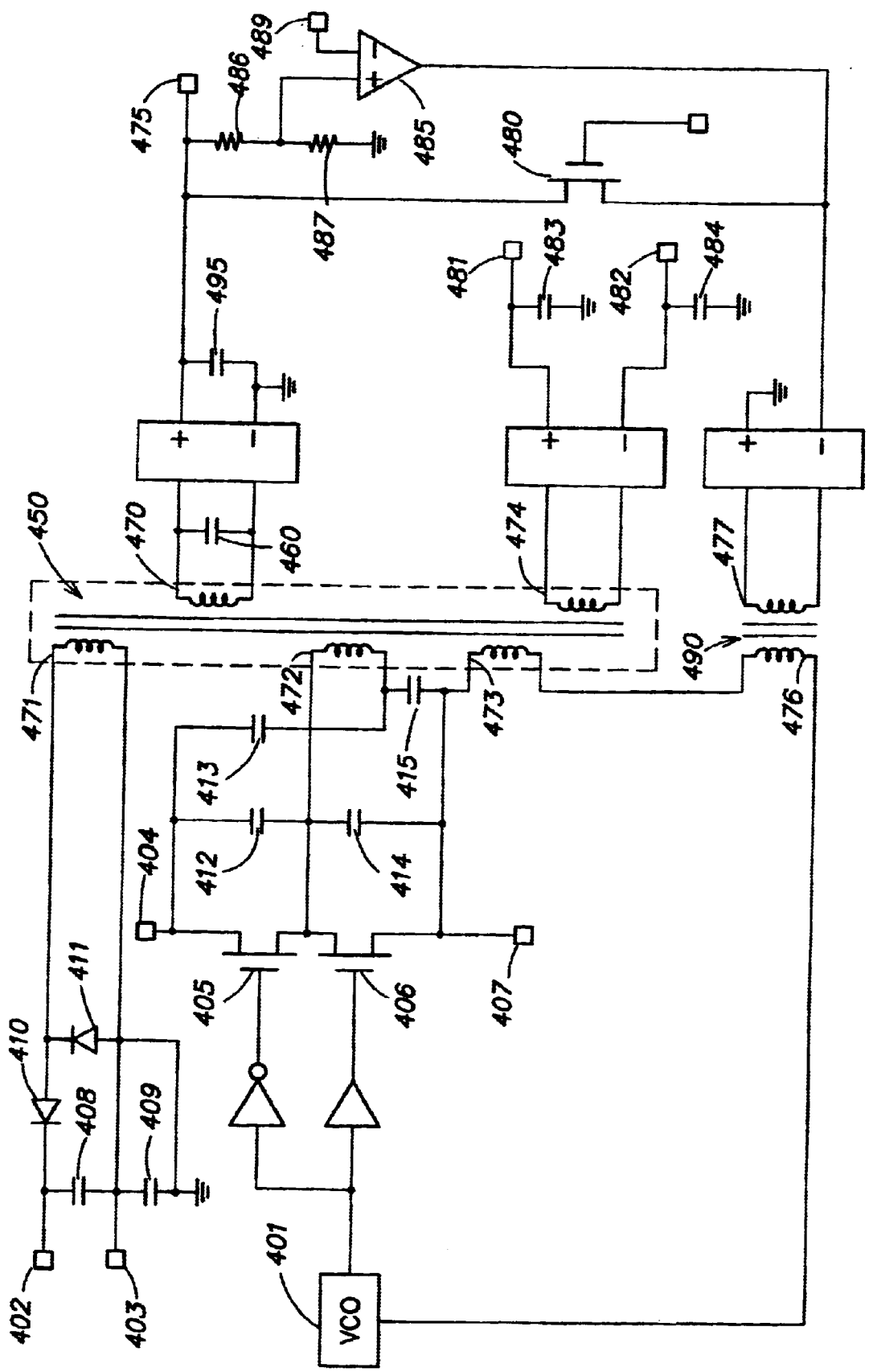
FIG. 4 is a schematic diagram of a low voltage DC supply in accordance with one embodiment of the invention.

Referring to FIG. 4, the low voltage DC supply comprises an HP inverter, a VCO, a transformer coupling an output of the HF inverter to an X-ray tube filament driver and a fault detection circuit.

The HF Inverter comprises a resonant circuit that includes a leakage inductance of the transformer 450, a resonance capacitance 460 across a secondary 470 of the transformer 450. The HF inverter further comprises a switching circuit comprising a first IGBT 405 and a second IGBT 406. The secondary 470 and 474 are respectively connected to rectifier bridges. The output of the bridges gives the supply voltage 475, 481, 482. Supply voltage 475 is typically 180 V DC and supply voltage 481 and 482 are typically +24 V DC and −24 V DC, respectively. Resistors 486 and 487 form the output divider connected to an amplifier 485, which is an error amplifier arranged to shift the frequency of VCO 401 depending on the load.

The frequency of the VCO is determined by the reflected impedance of a transformer 490. This impedance is in series with a primary winding 473. Varying the impedance will therefore give a variable voltage to the VCO input, controlling the frequency, a low impedance of winding 476 will give the highest frequency, there the lowest power output.

Tube Filament Supply

Figure 8:
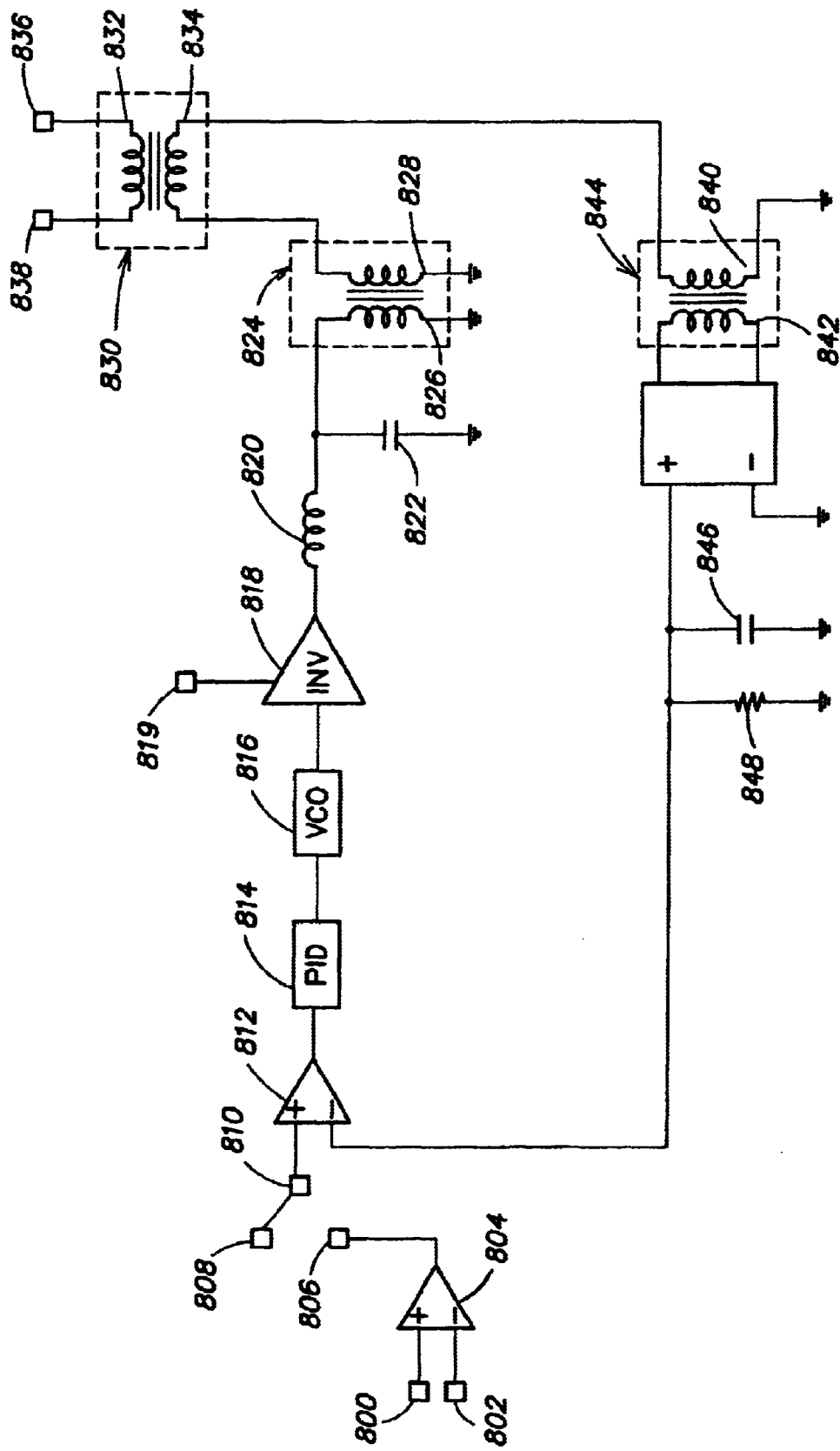
FIG. 8 is a schematic of a low voltage filament supply in accordance with one embodiment of the invention.

A tube-filament supply shown in FIG. 8 provides high frequency AC power to an X-ray tube filament through a filament transformer 830.

The filament supply voltage is generated by a resonant HF Inverter 818. The HF Inverter 818 is supplied with 180 volts DC by the low voltage DC supply at node 819. The tube-filament supply also comprises a resonant circuit which comprises a leakage inductance 820, a filament drive transformer 824 and a capacitance 822 coupled across a primary winding 826 of the filament drive transformer 824. The secondary winding 828 of the filament drive transformer 824 couples to a primary winding 834 of a filament transformer current transformer 830, whose secondary winding 834 couples to a cathode filament of an X-ray tube at nodes 838 and 836. The secondary winding 828 coupled to primary winding 834 further couples to a primary winding 840 of a current transformer 844, whose secondary winding 842 couples to the error amplifier 812.

Voltage Control Feedback Loop

In an embodiment of the present invention, an operational amplifier circuit implements a proportional-integral-derivative (PID) 814 arranged in a high-voltage control loop to provide a control mechanism for VCO circuit 816. According one aspect of the invention, an integration circuit and a derivation circuit comprises RC circuits associated with the operational amplifier circuit. A controller 812 compares a predetermined voltage to an actual voltage and outputs a control voltage to the VCO 810 that is proportional to a difference between the two voltages and a derivative and an intergral term. There is a single predetermined voltage for the total anode-to-cathode voltage. The actual voltage can be obtained by a summing measurement of the anode and cathode voltages (shown in FIG. 2) via sampling resistors coupled between the high voltage divider 340 and then ground; and summing the voltages via operational amplifiers.

What is claimed:
1. A high-voltage power supply for a device which has a load, comprising:
   a first resonant inverter providing a first output signal and a second resonant inverter providing a second output signal;
   a control circuit including a voltage controlled oscillator and a phase shifter, said control circuit being coupled to the first inverter and to the second inverter constructed to control a phase difference between said first output signal and said second output signal; and at least one high-voltage transformer including a primary side and a secondary side providing power to a load; said primary side including a first pair of primary coils connected in parallel to receive the first output signal and including a second pair of primary coils connected in parallel to receive the second output signal; the high-voltage transformer being constructed so that the first output signal having a first phase and the second output signal having a second phase are summed to provide a variable power to the load depending on the phase difference between the first phase and the second phase.

2. The power supply as claimed in claim 1, wherein the load is a medical device.

3. The power supply as claimed in claim 1 wherein the control circuit is constructed for pulse width modulation of the first and second resonant inverters.

4. The power supply as claimed in claim 1, wherein the load is a medical device designed to receive a DC voltage.

5. The power supply as claimed in claim 1, wherein the first output signal is coupled to said first pair of primary coils using a first switch and the second output signal is coupled to said second pair of primary coils using a second switch and wherein said first and second switches are selectively openable while providing power to the load.

6. The power supply as claimed in claim 1, wherein the first inverter and the second inverter receive clock inputs at the same frequency but having different phases.

7. The power supply as claimed in claim 1, wherein the control circuit comprises a control signal generator providing input to at least one of said inverters.

8. The power supply as claimed in claim 7, wherein the control signal generator includes said voltage controlled oscillator, said phase shifter, an amplifier and an isolation transformer.

9. The power supply as claimed in claim 7, wherein the control circuit is constructed to generate a first clock output coupled to the first inverter, and generate a second clock output coupled to the second inverter.

10. The power supply as claimed in claim 1, wherein the first inverter and the second inverter receive one clock input having the same frequency and the same phase.

11. The power supply as claimed in claim 1, wherein the secondary side includes plurality of secondary coils each said secondary coil corresponding to one primary coil.

12. The power supply as claimed in claim 11 further comprising a plurality of capacitors associated with said plurality of secondary coils, each said capacitor being connected across an output of one said secondary coil to form an LC circuit element.

13. The power supply as claimed in claim 11 further comprising a high voltage rectifier stack having a plurality of multiplication modules, each multiplication module having an AC input connected to said secondary coil and a DC output.

14. The power supply as claimed in claim 13, wherein the AC inputs of the multiplication modules are connected in parallel.

15. The power supply as claimed in claim 14, wherein the parallel connections of the multiplication modules are through at least one coupling voltage limiting device.

16. The power supply as claimed in claim 15, wherein the plurality of multiplication modules further comprises a DC return resistor mechanism across at least one of the coupling voltage limiting devices.

17. The power supply as claimed in claim 13, wherein the DC outputs of the multiplication modules are connected in series.

18. The power supply as claimed in claim 13, wherein the plurality of multiplication modules comprise an output filter voltage limiting device across each DC output of the multiplication modules.

19. The power supply as claimed in claim 18, wherein a capacitance of the coupling voltage limiting devices is at least less than a capacitance of the output filter voltage limiting devices connected across the DC outputs of the multiplication modules connected in parallel.

20. The power supply as claimed in claim 13, wherein the plurality of multiplication modules comprises a full-wave bridge.

21. The power supply as claimed in claim 20, wherein the full-wave bridge includes a four diode bridge.

22. The power supply as claimed in claim 13 further comprising a capacitor connected across each said AC input and each said secondary coil.

23. The power supply as claimed in claim 1 further comprising a load sharing mechanism constructed to substantially equalize power load on each said resonant inverter.

24. The power supply as claimed in claim 23 wherein said load sharing mechanism includes a first tertiary primary coil associated with said first pair of primary coils and a second tertiary primary coil associated with said second pair of primary coils, said tertiary primary coils being connected in parallel.

25. The power supply as claimed in claim 23 including a first switch constructed and arranged to couple the first output signal to said first pair of primary coils, and a second switch constructed and arranged to couple the second output signal to said second pair of primary coils, said first and second switches being selectively openable while providing power to the load.

26. The power supply as claimed in claim 1 further comprising:

a third resonant inverter providing a third output signal, and a fourth resonant inverter providing a fourth output signal; and at least another one high-voltage transformer including a primary side and a secondary side providing power to a load; said primary side including a third pair of primary coils connected in parallel to receive the third output signal and including a fourth pair of primary coils connected in parallel to receive the fourth output signal, wherein said control circuit is constructed to control a phase difference between said third output signal and said fourth output signal.

27. The power supply as claimed in claim 26 wherein the control circuit is constructed for pulse width modulation of the first, second, third and fourth resonant inverters.

28. The power supply as claimed in claim 26 further comprising a load sharing mechanism constructed to substantially equalize power load on each said resonant inverter.

29. The power supply as claimed in claim 28 wherein said load sharing mechanism includes a first tertiary primary coil associated with said first pair of primary coils, a second tertiary primary coil associated with said second pair of primary coils, said first and second tertiary primary coils being connected in parallel, and further includes a third tertiary primary coil associated with said third pair of primary coils and a fourth tertiary primary coil associated with said fourth pair of primary coils, said third and fourth tertiary primary coils being connected in parallel.

30. The power supply as claimed in claim 28 including
a first switch constructed and arranged to couple the first output signal to said first pair of primary coils,
a second switch constructed and arranged to couple the second output signal to said second pair of primary coils,
a third switch constructed and arranged to couple the third output signal to said third pair of primary coils, and
a fourth switch constructed and arranged to couple the fourth output signal to said fourth pair of primary coils, said first, second, third and fourth switches being selectively openable while providing power to the load.

31. The power supply as claimed in claim 26 wherein each said resonant inverter includes at least two power transistors, each said transistor having its gate controlled by a signal from said control circuit.

32. The power supply as claimed in claim 1 wherein each said resonant inverter includes at least two power transistors, each said transistor having its gate controlled by a signal from said control circuit.

33. A method for controlling a first resonant inverter and a second resonant inverter connected in parallel, each resonant inverter having a phase output, the method comprising the steps of:
setting a first phase to the output of the first resonant inverter;
setting a second phase to the output of the second resonant inverter;
selectively shifting at least one phase output of the resonant inverter for achieving a predetermined magnitude of a voltage in a predetermined time; and
sharing load between said first and second resonant inverters using inductive coupling to substantially equalize power load on each said resonant inverter.

34. The method as claimed in claim 33 further comprising the step of summing the first and second phase outputs.

35. The method as claimed in claim 33, wherein the first and second generators are resonant generators controlled to provide a variable frequency output.

36. A high-voltage power supply, comprising:
a first resonant inverter providing a first output signal and a second resonant inverter providing a second output signal;
a control circuit including a voltage controlled oscillator and a phase shifter, said control circuit being coupled to the first inverter and to the second inverter and constructed to control a phase difference between said first output signal and said second output signal; and
an inductive a load sharing mechanism constructed to substantially equalize power load on each said resonant inverter when said the first output signal having a first phase and the second output signal having a second phase are combined to provide a power to the load.

37. The power supply as claimed in claim 36, wherein the control circuit is constructed for pulse width modulation of the first and second resonant inverters.

38. The power supply as claimed in claim 36, wherein the control circuit is constructed vary a frequency of the first and second output signal provided by the respective first and second resonant inverters and thereby vary power provided to the load.

39. The power supply as claimed in claim 36, wherein the control circuit including the phase shifter are constructed vary said phase difference of the first and second output signal and thereby vary power provided to the load.

40. The power supply as claimed in claim 36, wherein each said resonant inverter includes at least two power transistors, each said transistor having its gate controlled by a signal from said control circuit.

* * * * *